United States Patent
Christensen et al.

(10) Patent No.: US 8,655,086 B1
(45) Date of Patent: Feb. 18, 2014

(54) IMAGE COMPRESSION WITH ALPHA CHANNEL DATA

(75) Inventors: Eric Christensen, San Francisco, CA (US); Marc Hanson, San Francisco, CA (US)

(73) Assignee: Zynga, Inc., San Francisco, CA (US)

( * ) Notice: Subject to any disclaimer, the term of this patent is extended or adjusted under 35 U.S.C. 154(b) by 28 days.

(21) Appl. No.: 13/435,651

(22) Filed: Mar. 30, 2012

Related U.S. Application Data

(60) Provisional application No. 61/554,158, filed on Nov. 1, 2011.

(51) Int. Cl.
*G06K 9/36* (2006.01)
*G06K 9/46* (2006.01)

(52) U.S. Cl.
USPC .......................................................... 382/233

(58) Field of Classification Search
USPC .................. 382/232, 233, 253; 345/592, 612; 375/240.25
See application file for complete search history.

(56) References Cited

U.S. PATENT DOCUMENTS

| | | | | |
|---|---|---|---|---|
| 5,497,498 | A * | 3/1996 | Taylor | 710/104 |
| 7,016,417 | B1 * | 3/2006 | Roman et al. | 375/240.23 |
| 8,014,615 | B2 * | 9/2011 | Uro | 382/233 |
| 2004/0247186 | A1 * | 12/2004 | Graves et al. | 382/232 |

* cited by examiner

*Primary Examiner* — Amir Alavi
(74) *Attorney, Agent, or Firm* — Schwegman, Lundberg & Woessner, P.A.

(57) ABSTRACT

Techniques for a compressed image with alpha channel data are described. Encoded alpha channel data from a compressed image representation may be extracted. A common type pixel run characteristic may be determined for at least one common type pixel run represented in the encoded alpha channel data. A common alpha channel value is applied, based on the common type pixel run characteristic, to pixels in a decompressed image representation correlated to the at least one common type pixel run. Pixels in the decompressed image representation correlating to at least one lookup type pixel run represented in the encoded alpha channel data may be processed. The processing may include a determination of an alpha channel value based on pixel data, specific to a pixel correlated to the lookup type pixel run, in the encoded alpha channel data and an application of the alpha channel value to the pixel.

48 Claims, 5 Drawing Sheets

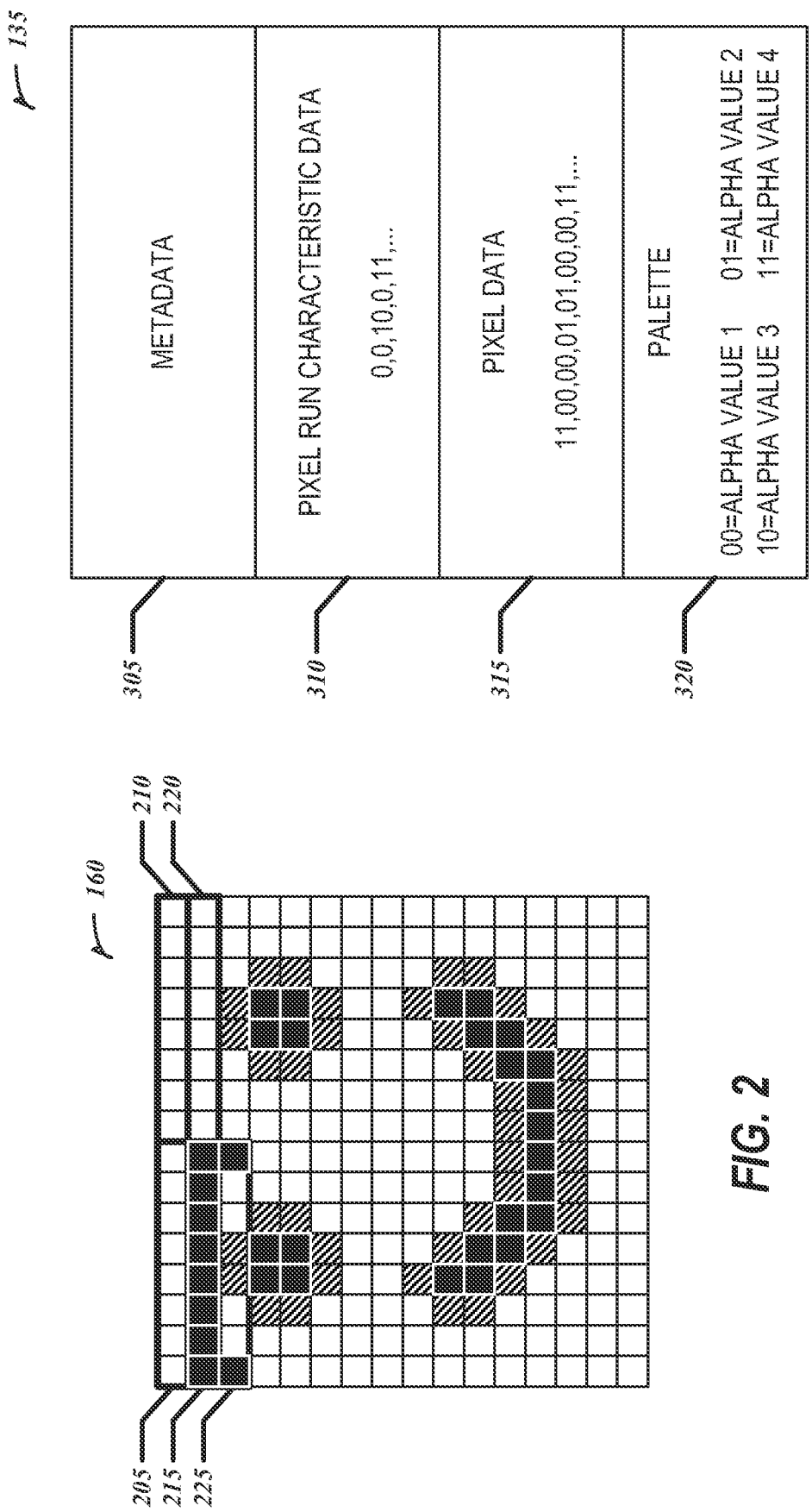

IMAGE COMPRESSION WITH ALPHA CHANNEL DATA

CLAIM OF PRIORITY

This patent application claims the benefit of priority, under 35 U.S.C. Section 119(e), to U.S. Provisional Patent Application Ser. No. 61/554,158, titled "IMAGE COMPRESSION WITH ALPHA CHANNEL," filed on Nov. 1, 2011, which is hereby incorporated by reference herein in its entirety.

BACKGROUND

Computer based image representations (image representations) may be used in a variety of computer applications, including illustrations (e.g., background, characters, symbols, etc.) to enhance a user's experience when using the computer applications. Image representations generally contain pixel display characteristics—such as red, green, blue, and alpha channel values—that may be combined to render the pixel on, for example, a computer screen or printer. Alpha channel values generally indicate a transparency degree for a pixel (e.g., a percentage of transparency from zero (opaque) to one hundred (invisible)). Including pixel transparency information (e.g., via an alpha channel) may permit foreground elements to implicitly include background elements (e.g., viewing the background through a window pane), increasing efficiency in creating visual elements as well as the user's visual experience.

BRIEF DESCRIPTION OF THE DRAWINGS

Various systems, techniques, and data structures for a compressed image with alpha channel data are described. The present disclosure is illustrated by way of example, and not limitation, in the figures of the accompanying drawings, in which like reference numerals indicate similar elements unless otherwise indicated.

FIG. 2 illustrates an example of a decompressed image representation of alpha channel data, according to an embodiment.

FIG. 3 illustrates an example of encoded alpha channel data, according to an embodiment.

DESCRIPTION OF EXAMPLE EMBODIMENTS

Figure 1:
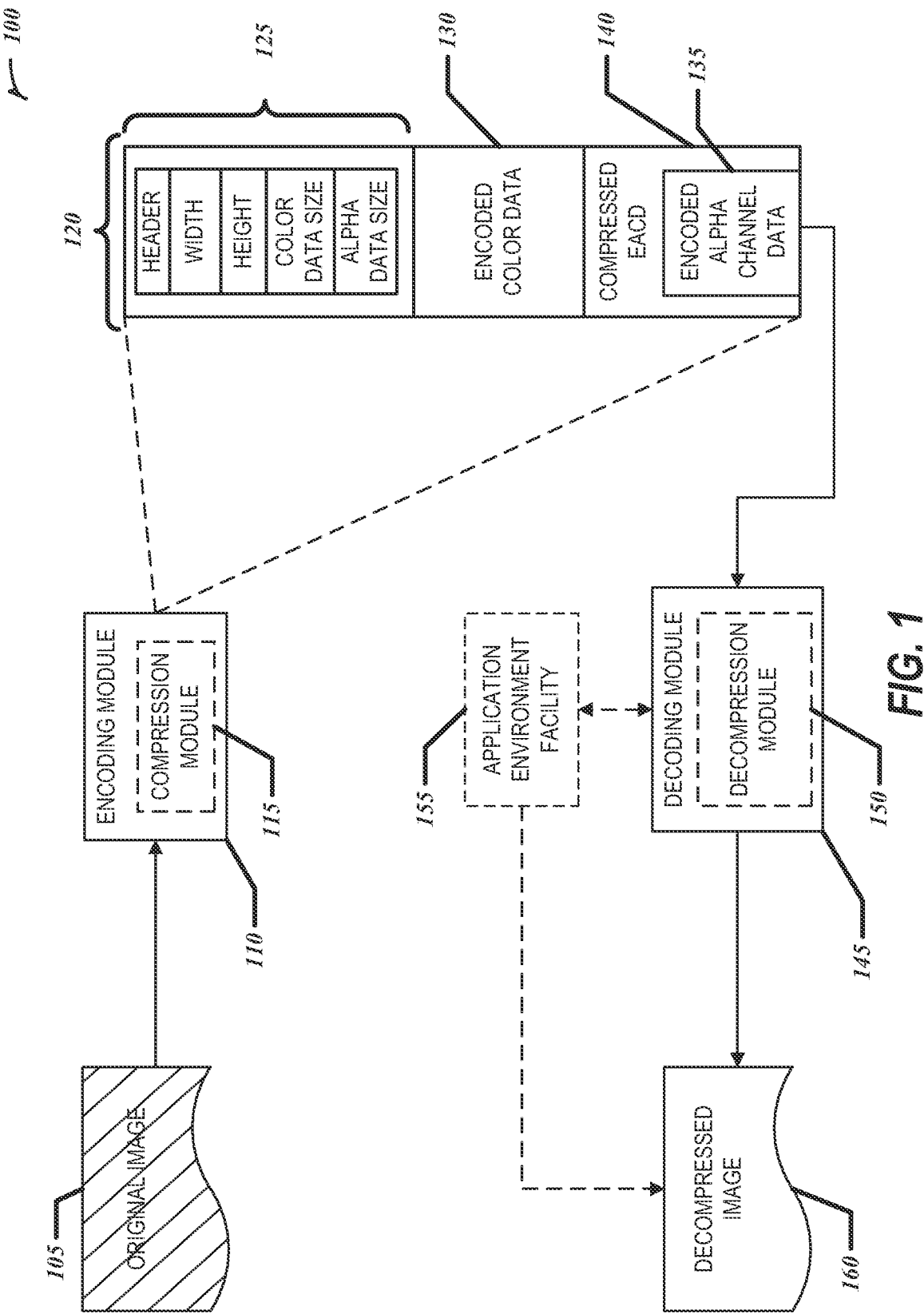
FIG. 1 illustrates a block diagram of an example of a system to create and use a compressed image with alpha channel data, according to an embodiment.

As previously stated, image representations may be used in a variety of computer applications to construct or supplement a user's visual experience with the computer application. When the computer application is served from a server machine (e.g., in a client-server architecture) to a client machine over a network (e.g., in a web-based game), the image representations used by the computer application are transmitted over the network. Detailed image representations (e.g., high-resolution images) may consume a large amount of network bandwidth to transmit. In some games, the loading time (e.g., time between an initial user request to play the game and a point when the user may interact with the game) may be adversely affected when a large number of detailed computer images are used by the application. However, simply reducing the detail of the image representations (e.g., by lowering the resolution) may adversely affect the user's visual experience.

An example image compression method may provide a compressed image with alpha channel data. The compressed image may be produced by splitting color data (e.g., red, green, and blue channels) from the alpha channel of an original image representation. Pixel runs (e.g., a set of contiguous pixels) from the original image representation may be represented in encoded alpha channel data of a compressed image representation.

Pixel runs may be processed. Pixel run representations may include pixel run characteristic data. Common type pixel runs may be pixel runs in which members have a common alpha channel value. In an example, the common alpha channel value is from a set of common alpha channel values with fewer members than the alpha channel values represented or possible in the original image representation. The common type alpha channel value may be represented by, or in, common type pixel run characteristic data.

Lookup type pixel runs may represent pixel runs whose member pixels have either varied alpha channel values (e.g., at least two pixels have different alpha channel values) or an alpha channel value that is not in the set of common alpha channel values. Lookup type pixel run characteristic data may include an indication that the pixel run is a lookup type pixel run. A lookup type pixel run may indicate that individual pixel alpha channel values will be looked-up (e.g., resolved), for example, from a palette. Alpha channel values, or representations thereof, may be encoded into pixel data in the encoded alpha channel data, for each pixel in the lookup type pixel run.

In an example, at least one of the common alpha channel value or the alpha channel value may be quantized (e.g., reduced) from the respective alpha channel values in the original image representation. In an example, the palette may include a subset of the original image representation's possible alpha channel values (e.g., all alpha channel values that may be represented by the original image representation). In an example, palette may include fewer entries than the alpha channel values used in the original image representation. In an example, the encoded alpha channel data, as a whole, may be compressed (e.g., using a general purpose compression scheme such as DEFLATE). The color data may be encoded separately from the alpha channel data, e.g. by using existing compression schemes, such as that employed in the Joint Photographic Experts Group (JPEG) format, and may be included in the compressed image representation.

Decompressing the compressed image representation may include extracting the encoded alpha channel data from the compressed image representation. Pixel runs may be processed. For common type pixel runs, a common type pixel run characteristic may be determined and a common alpha channel value, correlated to the common type pixel run characteristic, may be applied to pixels in the decompressed image representation. When a lookup type pixel run is encountered, pixel data, correlated to the lookup type pixel run, may be used to apply alpha channel values to the pixels in the decompressed image representation correlated to the lookup type pixel run. In an example, the pixel data includes a palette entry index to resolve the alpha channel value with respect to a pixel. In an example, the encoded alpha channel data is decompressed (e.g., using INFLATE) prior to extraction of the encoded alpha channel data from the compressed image representation. In an example, encoded color data, in the compressed image representation, may be decoded and applied to the decompressed image representation.

The described compressed image representation may take advantage of existing non-alpha channel capable image compression schemes while efficiently including alpha channel data. The alpha channel data may take advantage of large contiguous sets of pixels in the original image representation with the same alpha channel values (e.g., runs of transparent or opaque pixels) using pixel run representations and pixel run characteristic data. When individual pixel values are encoded, data efficiency may be achieved via quantization or indexing, such as with a palette. Thus, efficient image representation with alpha channel values is achieved.

FIG. 1 illustrates a block diagram of an example of a system 100 to create and use a compressed image with alpha channel data. The system 100 may include an encoding system and a decoding system, each of which may be separated and exist (e.g., operate) independently from each other. However, for clarity, these two systems are here presented together.

Encoding

The system 100 may include an encoding module 110. The encoding module 110 may be configured to generate a representation of a common type pixel run in an encoded alpha channel data 135 of a compressed image representation 120 from a set of contiguous common alpha channel value pixels in an original image representation 105. In an example, the members of the set of common contiguous alpha channel value pixels may share a common alpha channel value from a set of common alpha channel values. In an example, the set of common alpha channel values may have fewer members than the number of possible original alpha channel values from the original image representation 105. Thus, in this example, not all contiguous pixel runs sharing the same alpha channel value are represented by a common type pixel run. In an example, the set of common alpha channel values may consist of only opaque and transparent values, so that only runs of opaque or transparent pixels may be represented by a common type pixel run. The representation of the common type pixel run may include a common type pixel run characteristic correlating to the common alpha channel value. Individual pixel alpha channel data is not separately encoded in the encoded alpha channel data 135.

The encoding module 110 may be configured to generate a representation of a lookup type pixel run in the encoded alpha channel data 135 from a set of contiguous lookup alpha channel value pixels in the original image representation 105. In a lookup type pixel run, at least one member of the set of contiguous lookup alpha channel value pixels may either have an alpha channel value that is different than another member of the set (e.g., not all members of the set have the same alpha channel value) or even if all of the members have the same alpha channel value, the alpha channel value is not in the set of common alpha channel values. The encoding module 110 may be configured to represent the individual alpha channel data of the lookup type run pixels separately in encoded alpha channel data 135.

In an example, the length (e.g., stride) of a pixel run represented in the encoded alpha channel data 135 may be uniform (e.g., global) for every pixel run represented in the encoded alpha channel data 135 including the common type pixel runs and the lookup type pixel runs. In an example, the encoding module 110 may be configured to select the length from a plurality of lengths. In an example, the plurality of lengths may be $2^2$, $2^3$, $2^4$, or $2^5$ pixels. In an example, the encoding module 110 may be configured to analyze the original image representation 105 to determine the length, for example, based on a greater degree of data reduction between the original image representation 105 and the compressed image representation 120. For example, the encoding module 110 may be configured to record the length of the pixel run in metadata of the encoded alpha channel data 135. In an example, the encoding module 110 may be configured to select variable lengths variance in length between pixel runs) for each pixel run represented in encoded alpha channel data 135. The variable nm lengths may be recorded in respective pixel run characteristics, in metadata of the encoded alpha channel data 135, or elsewhere in the encoded alpha channel data 135 such that an individual pixel run's length may be correlated to the pixel run.

To encode the individual pixel data for a lookup type pixel run's associated pixels, the encoding module 110 may be configured to generate, for each pixel in the set of lookup alpha channel value pixel data in the encoded alpha channel data 135. The pixel data may include an alpha channel value representation of an alpha channel value correlating to the pixel.

In an example, the encoding module 110 may be configured to quantize the common alpha channel value to produce the common type pixel run characteristic. In an example, the encoding module 110 may be configured to quantize the alpha channel value to produce the alpha channel value representation. Quantization, as used herein, is the translation of one set of values (e.g., all possible alpha channel values in the original image representation 105) to a smaller set of values. For example, if the original image representation 105 could represent $2^8$ (256) alpha channel values, the quantized set could represent $2^4$ (16) alpha channel values. A variety of techniques may be used to perform the translation, including an analysis of the original image representation 105 to determine significant alpha channel values, simple rounding, etc. In an example, the alpha channel value representation may be an index to a palette in the encoded alpha channel data 135, where the palette may contain the quantized alpha channel values.

In an example, the encoding module 110 may be configured to generate the palette. Generating the palette may include mapping original alpha channel values from the original image representation 105 to palette entries via quantization). The number of palette entries may be smaller than the number of possible original alpha channel values. For example, if the original image representation 105 could support 256 alpha channel values, but only 80 alpha channel values were used in the original image representation 105, the palette could include 80 entries. In an example, the number of palette entries is fewer than a number of original alpha channel values, the number of original alpha channel values being a set of unique alpha channel values of the pixels of the original image representation 105. In this example, referencing the previous example, the number of palette entries is fewer than 80, such that a plurality of originally used alpha channel values are mapped to a single palette entry.

In an example, the encoding module 110 may be configured to separate color data from the original image representation 105 from alpha channel data in the original image representation 105. The encoding module 110 may also be configured to generate encoded color data 130 in the compressed image representation 120. In an example, the encoding module 110 may encode the color data to create encoded color data 130. In an example, the encoding module 110 may enlist an external entity, such as an application environment, or operating system service, to encode the color data. In an example, the encoded color data 130 may be in a JPEG format (e.g., encoded into a PEG format).

In an example, the encoding module 110 may include, or may be communicatively coupled to, a compression module 115. The compression module 115 may configured to compress encoded alpha channel data 135 to create compressed encoded alpha channel data 140.

In an example, the encoding module 110 may be configured to create, update, or otherwise modify compressed image representation metadata 125. The compressed image representation metadata 125 may include any information about the compressed image representation 120, including a header (e.g., a string indicating the file type), image width (e.g., in pixels, inches, or other metric), image height, color data size (e.g., the size in bits, bytes, or other metric of the color data), and alpha data size. In an example, the header, width, height, color data size, and alpha data size are each represented with four bytes.

Decoding

The decoding module 145 may be configured to decode the compressed image representation 120 to produce the decompressed image representation 160. The decoding module 145 may be configured to extract encoded alpha channel data 135 from a compressed image representation 120. In an example, the decoding module 145 may include, or be communicatively coupled to, a decompression module 150. The decompression module 150 may be configured to decompress (e.g., using INFLATE) compressed encoded alpha channel data 140 in the compressed image representation 120.

The decoding module 145 may be configured to determine, for at least one common type pixel run represented in the encoded alpha channel data 135, a common type pixel run characteristic. The decoding module 145 may be configured to apply, based the common type pixel run characteristic, a common alpha channel value to pixels in a decompressed image representation 160 correlated to a common type pixel run. For example, given a first pixel run of eight pixels and a common type pixel run characteristic correlated to transparent (e.g., 100% transparency), the first eight pixels in the decompressed image representation 160 will be assigned an alpha channel value of transparent. As with encoding, individual pixel data is not used when processing a common type pixel run represented in the encoded alpha channel data 135.

For lookup type pixel runs represented in the encoded alpha channel data 135, the decoding module 145 may be configured to process pixels in the decompressed image representation 160 correlated to a lookup type pixel run represented in the encoded alpha channel data 135. In an example, the decoding module 145 may be configured to perform this process (e.g., processing the pixels) by, for each pixel in the decompressed image representation 160 correlated to the at least one lookup type pixel run, determine an alpha channel value based on pixel data, specific to the pixel, in the encoded alpha channel data 135, and apply the alpha channel value to the pixel. In an example, the decoding module 145 can be configured to determine the alpha channel value by reference to a palette with the pixel data (e.g., the pixel data includes an index to an entry of the palette). In an example, the palette may be in the encoded alpha channel data 135.

In an example, a pixel run length is uniform (e.g., the same) for every pixel run represented in the encoded alpha channel data 135, such as common type pixel runs and the lookup type pixel runs. In such a case, an image may be divided into a plurality or runs or subsets of uniform length of size, and each run may be assessed to determine whether it is a common type pixel run or whether it is a lookup type pixel run. In an example, the decoding module 145 may be configured to extract the length of the pixel run from metadata in the encoded alpha channel data 135. In an example, the pixel runs may be variable, as described above. In this example, the decoding module 145 may be configured to extract individual pixel run lengths from the metadata of the encoded alpha channel data 135, pixel run characteristic data, or any other data where the length may be correlated to the particular pixel run.

In an example, the decoding module 145 may be configured to extract encoded color data 130 from the compressed image representation 120. The encoded color data 130 may be separate from the encoded alpha channel data 135 in the compressed image representation 120. In an example, decoding module 145 may be configured to apply (e.g., decode) the extracted color data to the decompressed image representation 160. In an example, the encoded color data 130 is in a PEG format. In an example, the decoding module 145 may be configured to apply the color data to the decompressed image representation 160 by, for example, passing the color data to an application environment facility 155 (e.g., an Adobe Flash client-side execution environment) to decode and populate color information of the decompressed image representation 160.

FIG. 2 illustrates an example of a decompressed image representation 160 of alpha channel data. Each square shown in FIG. 2 represents a pixel in an example decompressed image representation 160. White pixels are fully transparent, black pixels are opaque (e.g., not transparent at all), and shaded pixels are semi-transparent (e.g., 50% transparent). FIG. 2 also shows five pixel runs, each representing a line of eight contiguous pixels. In other examples, pixel runs may instead or in addition be squares or rectangles of contiguous pixels. Additional pixel runs are not shown in FIG. 2, for clarity of illustration. Pixel runs 205, 210, and 220 all include only pixels that share the transparent alpha channel value. Pixel run 215 includes only pixels that share an opaque alpha channel value. Pixel run 225 includes pixels with varied or different respective alpha channel values. As described above, pixel run 225 is a lookup type pixel run. If transparent and opaque alpha channel values are in the set of common alpha channel values, then pixels runs 205, 210, 215, and 220 are all common type pixel runs.

Although FIG. 2 represents the decompressed image representation 160, it only differs, in terms of the illustrated alpha channel values, from the original image representation 105 in the possible quantization of alpha channel values. That is, the illustrated pixel runs may operate substantially the same in creating the compressed image representation 120 from the original image representation 105 as they do in creating the decompressed image representation 160 from the compressed image representation 120.

FIG. 3 illustrates an example of encoded alpha channel data 135. As described below, the example illustrated in FIG. 3 correlates to the decompressed image representation 160 illustrated in FIG. 2.

The encoded alpha channel data 135 may include encoded alpha channel data metadata 305, pixel run characteristic data 310, and pixel data 315. In an example, the encoded alpha channel data 135 may include a palette 320.

The pixel run characteristic data 310 is shown with commas between individual pixel run characteristic data 310; however, such delineations may not be used in practice. For example, if the various pixel run characteristic data 310 are encoded with a fixed number of bits, or for example, with prefix codes (e.g., using Huffman or arithmetic coding), individual pixel runs may be determined without such delineations. In the illustrated example, a common type pixel run characteristic datum of '0' is associated with the common alpha channel value of transparent and '10' with opaque. The lookup type pixel run characteristic datum is represented by '11'. Thus, while reading the pixel run characteristic data 310, when a '0' is encountered, the next bit represents a new pixel run. Further, a third bit represents a new pixel run when a '0' is not encountered (e.g., in the case of '11'). In an example, a prefix code may be used, such as '0'=transparent, '10'=opaque, and '110'=lookup. In an example, a greater number of codes may be used to represent a greater number of common type pixel runs, thus reducing the use of the pixel data 315. In an example, variable length codes may be chosen for common alpha channel values such that shorter codes are associated with more commonly occurring common alpha channel values. Statistical analysis may be used to rank common alpha channel values by their likelihood of occurrence.

In an example, the encoded alpha channel data metadata 305 may include a field of the size (e.g., in bits, bytes, etc.) of the pixel run characteristic data 310. In an example, the pixel run characteristic data 310 size field is four bytes. In an example, the encoded alpha channel data metadata 305 may include a field of the size (e.g., in bits, bytes, etc.) of the pixel data 315. In an example, the pixel data 315 size field is four bytes. In an example, the encoded alpha channel data metadata 305 may include a field of the size (e.g., in bits, bytes, etc.) of the palette 320. In an example, the palette 320 size field is four bytes.

Thus, in this example, the first four pixel run characteristic data 310 correlate to the pixel runs 205, 210, 215, and 220 illustrated in FIG. 2. No other information is needed to recreate those pixel runs than the illustrated pixel run characteristics. The fifth pixel run characteristic datum 310, '00', however, represents a lookup type pixel run. Here, the pixel data 315 (again delineated with commas for clarity only) may be used to determine the alpha channel values for pixels in the pixel run 225 of FIG. 2. Each illustrated pixel datum is uniquely correlated (e.g., by its order in sequence) to a pixel in the pixel run 225. The value of each pixel datum is an index (e.g., coordinate) to an entry of the palette 320. Upon reading a pixel datum, for example the first, the correlated alpha channel value, in this case ALPHA VALUE 4, may be retrieved (e.g., resolved, determined, etc.) and applied to the first pixel in the pixel run 225. This procedure may be repeated for each of the remaining pixels of the pixel run 225 represented in the pixel data 315.

Elements described above may be used in any combination with additional elements (e.g., components, systems, etc.) or not at all to perform the operations of the method examples described below.

Figure 4:
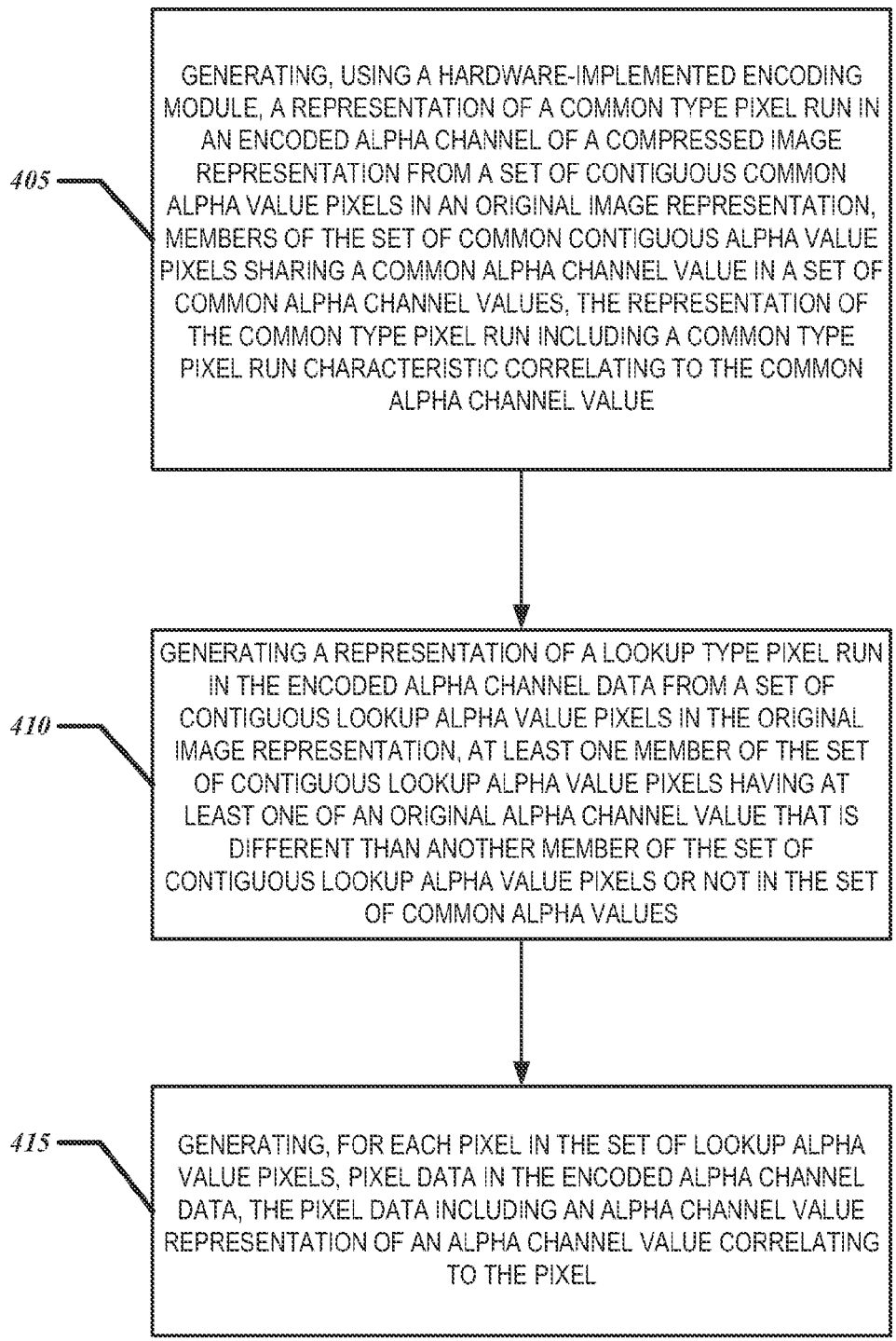
FIG. 4 illustrates a flowchart of an example of a method to create a decompressed image representation from a compressed image representation, according to one embodiment.

FIG. 4 illustrates a flowchart of an example of a method 400 to create a compressed image representation 120 from an original image representation 105.

At operation 405 a representation of a common type pixel run (e.g., the pixel run 205) may be generated in an encoded alpha channel data 135 of a compressed image representation 120 from a set of contiguous common alpha channel value pixels in an original image representation 105. Members of the set of common contiguous alpha channel value pixels may share a common alpha channel value in a set of common alpha channel values. The representation of the common type pixel run may include a common type pixel run characteristic correlating to the common alpha channel value. In an example, the set of common alpha channel values may consist of opaque and transparent alpha channel values.

At operation 410 a representation of a lookup type pixel run may be generated in the encoded alpha channel data 135 from a set of contiguous lookup alpha channel value pixels in the original image representation 105 where at least one member of the set of contiguous lookup alpha channel value pixels has either an original alpha channel value that is different than another member of the set of contiguous lookup alpha channel value pixels or not in the set of common alpha channel values. This is as described above with respect to FIG. 1.

At operation 415, for each pixel in the set of lookup alpha channel value pixel data 315 may be generated in the encoded alpha channel data 135. In an example, the pixel data 315 may include an alpha channel value representation of an alpha channel value correlating to the pixel.

In an example, at least one of the common alpha channel value or the alpha channel value is quantized to respectively produce the common type pixel run characteristic or the alpha channel value representation. Quantization may occur as described above with respect to FIG. 1. In an example, the alpha channel value representation may be an index to a palette 320 in the encoded alpha channel data 135. In an example, the palette 320 may be generated by mapping original alpha channel values from the original image representation 105 to palette entries. In an example, the number of palette entries may be fewer than the number of possible original alpha channel values. In an example, the number of palette entries may be fewer than the number of original alpha channel values (e.g., used in the original image representation 105), where the number of original alpha channel values are the set of unique alpha channel values of the pixels of the original image representation 105.

In an example, the encoded alpha channel data 135 may be compressed using DEFLATE) to create compressed encoded alpha channel data 140.

In an example, the length of a pixel run represented in the encoded alpha channel data 135 may be uniform (e.g., the same) for every pixel run represented in the encoded alpha channel data 135 including the common type pixel run and the lookup type pixel run. In an example, the length of the pixel run may be selected from a plurality of lengths based on, for example, a greater degree of data reduction between the original image representation 105 and the compressed image representation 120, as described above with respect to FIG. 1. In an example, the length of the pixel run may be recorded in metadata of the encoded alpha channel data 305. In an example, as described above, the length of variable pixel runs may be recorded throughout the encoded alpha channel data 135 such that it may be uniquely correlated to a pixel run.

In an example, color data from the original image representation 105 may be separated from alpha channel data in the original image representation 105.

In an example, encoded color data 130 may be generated in the compressed image representation 120 by encoding the separated color data to create the encoded color data 130. In an example, the encoded color data 130 is in a JPEG format.

Figure 5:
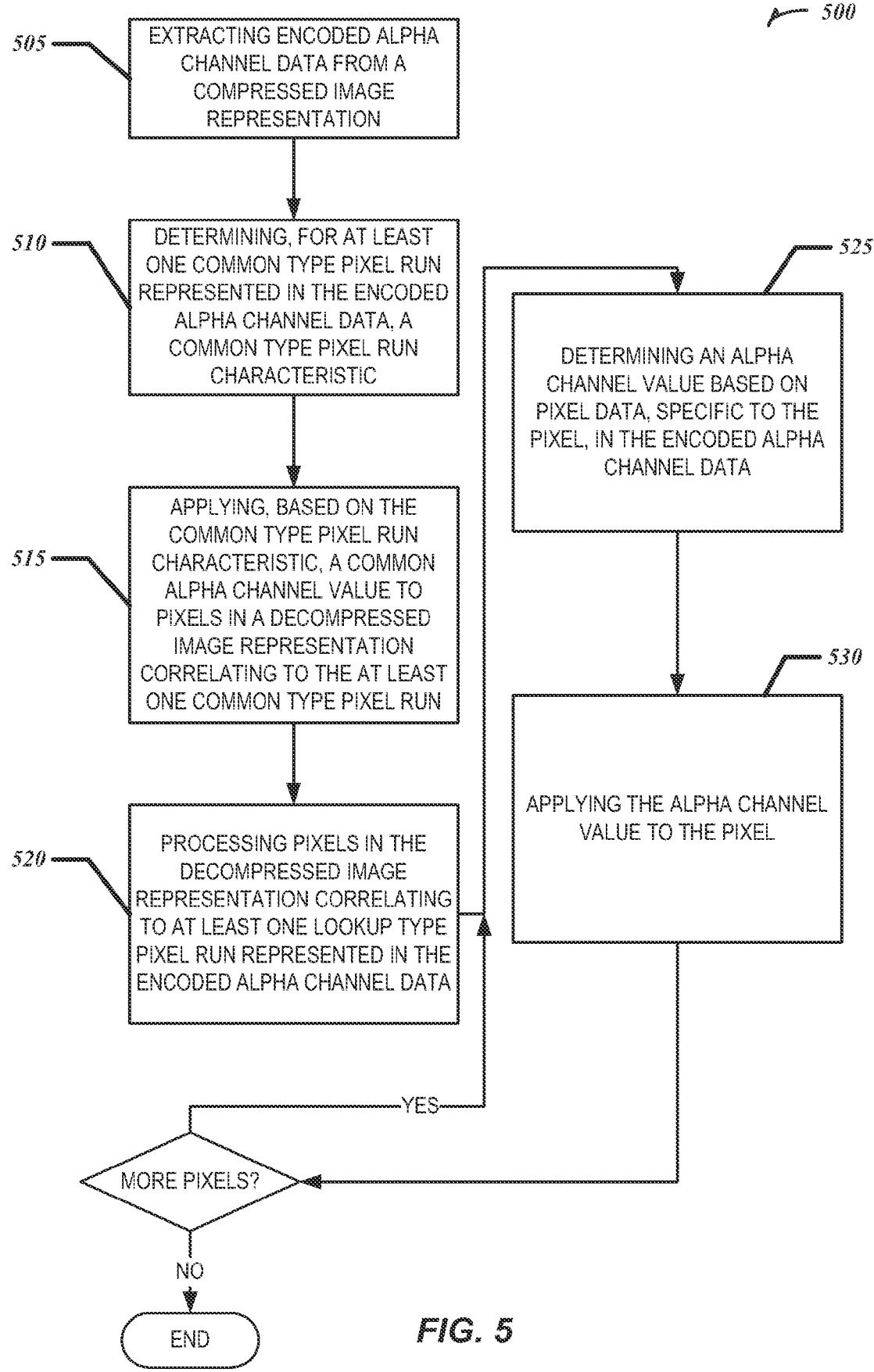
FIG. 5 illustrates a flowchart of an example of a method to create a compressed image representation from an original image representation, according to an embodiment.

FIG. 5 illustrates a flowchart of an example of a method 500 to create a decompressed image representation 160 from a compressed image representation 120.

At operation 505 extracting encoded alpha channel data 135 may be extracted from a compressed image representation 120. In an example, encoded color data 130 from the compressed image representation 120 may be extracted. In an example, the color data (e.g., after extraction and decoding) may be applied to the decompressed image representation 160. In an example, applying the color data to the decompressed image representation 160 may include passing the color data to an application environment facility 155 to decode and populate color information of the decompressed image representation 160. In an example, encoded color data 130 may be in a JPEG format. In an example, extracting encoded alpha channel data 135 may include decompressing compressed encoded alpha channel data 140 in the compressed image representation 120. In an example, INFLATE is used to decompress the compressed encoded alpha channel data 140.

At operation 510 a common type pixel run characteristic may be determined for at least one common type pixel run represented in the encoded alpha channel data 135.

At operation 515 based the common type pixel run characteristic, a common alpha channel value may be applied to pixels in a decompressed image representation 160 correlating to the at least one common type pixel run.

At operation 520 pixels in the decompressed image representation 160 correlating to at least one lookup type pixel run represented in the encoded alpha channel data 135 may be processed. Processing of the individual pixels may include performing operations 525 and 530 until each pixel in the decompressed image representation 160 correlated to the lookup type pixel run has had an alpha channel value assigned.

At operation 525 for the current pixel (e.g., the pixel currently being processed) an alpha channel value based on pixel data 315, specific to the pixel, in the encoded alpha channel data 135 may be determined.

At operation 530 the determined alpha channel value may be applied to the pixel. If there are additional pixels correlated to the lookup type pixel run, return to operation 525 to process the next pixel as the current pixel. Otherwise end the individual pixel processing for this lookup type pixel run. Additional pixel runs may continue to be processed until there are no more pixel run representations in the encoded alpha channel data 135. In an example, determining the alpha channel value may include referencing a palette 320 with the pixel data 315. In an example, the palette 320 may be in the encoded alpha channel data 135.

In an example, a length of a pixel run represented in the encoded alpha channel data 135 may be uniform for every pixel run represented in the encoded alpha channel data 135 including the common type pixel run and the lookup type pixel run. In an example, the length of the pixel run may be extracted from encoded alpha channel data metadata 305 in the encoded alpha channel data 135.

An advantage of the above-described image compression method is that benefits of using alpha channel data are provided while achieving significant compression to, for example, reduce network bandwidth, reduce latency in transmitted the image, and reduce storage space required to store the image representation. The resultant compressed image representation 120 therefore includes alpha channel data which is not included in some popular image compression systems, such as, for example, the Joint Photographic Experts Group (JPEG) formats, while providing superior compression to popular compression systems that support alpha channels, such as, e.g., Portal Network Graphics (PNG) formats.

Figure 6:
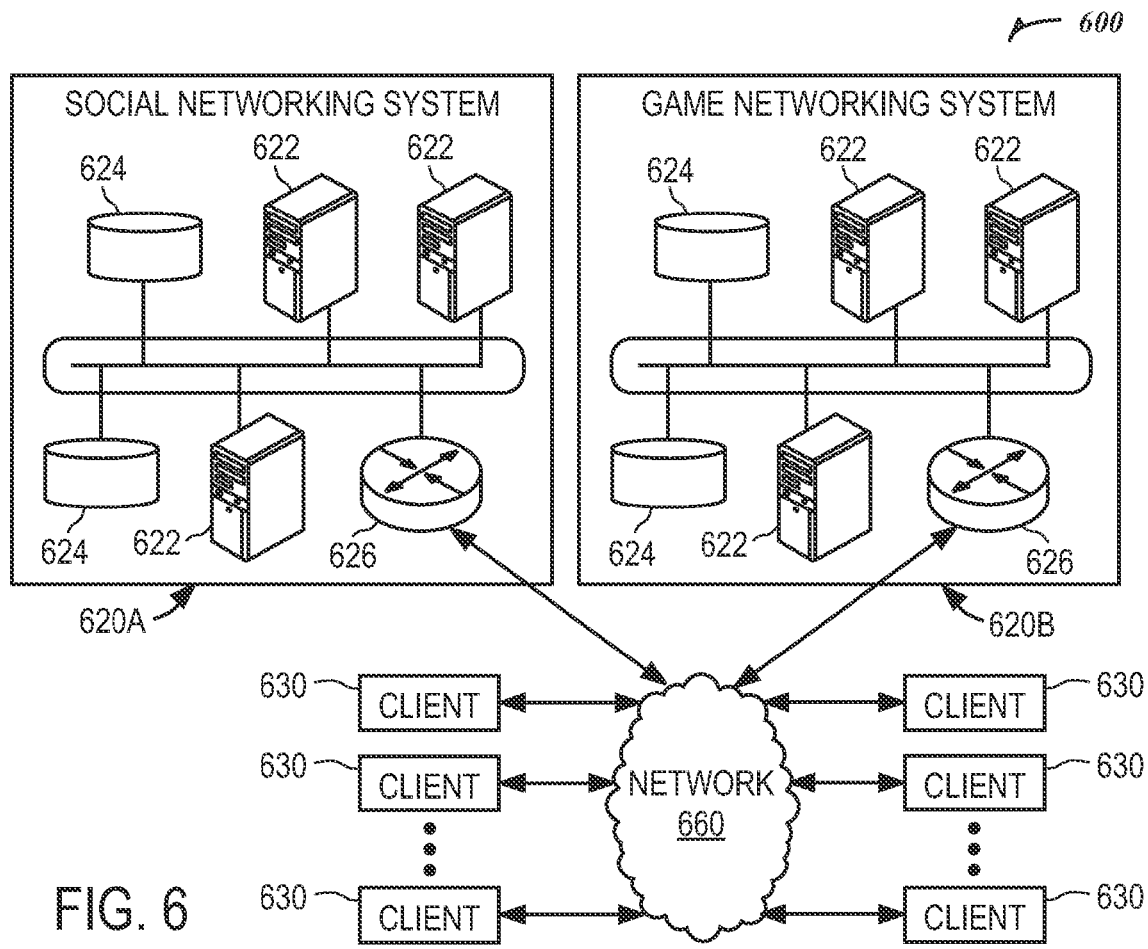
FIG. 6 illustrates an example of a network environment, in which an embodiment may operate.

Embodiments may operate in a wide area network environment, such as the Internet, including multiple network addressable systems. FIG. 6 illustrates an example network environment 600 in which various example embodiments may operate. The network environment 600 may include a network cloud 660 that generally represents one or more interconnected networks, over which the systems and hosts described herein may communicate. The network cloud 660 may include packet-based wide area networks (such as the Internet), private networks, wireless networks, satellite networks, cellular networks, paging networks, and the like. As FIG. 6 illustrates, particular embodiments may operate in the network environment 600 comprising one or more networking systems, such as a social networking system 620a, a game networking system 620b, and one or more client systems 630. The components of the social networking system 620a and the game networking system 620b operate analogously; as such, hereinafter they may be referred to simply as the networking system 620. The client systems 630 are operably connected to the network environment 600 via a network service provider, a wireless carrier, or any other suitable means.

The networking system 620 is a network addressable system that, in various example embodiments, comprises one or more physical servers 622 and data stores 624. The one or more physical servers 622 are operably connected to network cloud 660 via, by way of example, a set of routers and/or networking switches 626. In an example embodiment, the functionality hosted by the one or more physical servers 622 may include web or HTTP servers, FTP servers, as well as, without limitation, web pages and applications implemented using Common Gateway Interface (CGI) script, PHP Hypertext Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The network environment 600 may include physical servers 622 that may host functionality directed to the operations of the networking system 620. Hereinafter the servers 622 may be referred to as the server 622, although the server 622 may include numerous servers hosting, for example, the networking system 620, as well as other content distribution servers, data stores 624, and databases. The network environment 600 may also include a data store 624 that may store content and data relating to, and enabling, operation of the networking system 620 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, the data store 624 corresponds to one or more of a variety of separate and integrated databases, such as relational databases and object-oriented databases, that maintain information as an integrated collection of logically related records or files stored on one or more physical systems. Structurally, data store 624 may generally include one or more of a large class of data storage and management systems. In particular embodiments, the data store 624 may be implemented any suitable physical system(s) including components such as one or more database servers, mass storage media, media library systems, storage area networks, data storage clouds, and the like. In one example embodiment, data store 624 includes one or more servers 622, databases MySQL), and/or data warehouses. The data store 624 may include data associated with different networking system 620 users and/or client systems 630.

The client system 630 is generally a computer or computing device including functionality for communicating (e.g., remotely) over a computer network 622. The client system 630 may be a desktop computer, laptop computer, personal digital assistant (PDA), in or out-of-car navigation system, smart phone or other cellular or mobile phone, or mobile gaming device, among other suitable computing devices. The client system 630 may execute one or more client applications, such as a web browser (e.g., Microsoft Internet Explorer, Mozilla Firefox, Apple Safari, Google Chrome, and Opera), to access and view content over a computer network 622. In particular embodiments, the client applications allow a user of the client system 630 to enter addresses of specific network resources to be retrieved, such as resources hosted by the networking system 620. These addresses may be URLs and the like. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A web page or resource embedded within a web page, which may itself include multiple embedded resources, may include data records, such as plain textual information, or more complex digitally-encoded multimedia content, such as software programs or other code objects, graphics, images, audio signals, videos, and so forth. One prevalent markup language for creating web pages is the HyperText Markup Language (HTML). Other common web browser-supported languages and technologies include the Extensible Markup Language (XML), the Extensible Hypertext Markup Language (XHTML), JavaScript, Flash, ActionScript, Cascading Style Sheets (CSS), and, frequently, Java. By way of example, HTML enables a page developer to create a structured document by denoting structural semantics for text and links, as well as images, web applications, and other objects that may be embedded within the page. Generally, a web page may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at the client system 630 desires to view a particular web page (hereinafter also referred to as target structured document) hosted by the networking system 620, the user's web browser, or other document rendering engine or suitable client application, formulates and transmits a request to the networking system 620. The request generally includes a URL or other document identifier as well as metadata or other information. By way of example, the request may include information identifying the user, such as a user ID, as well as information identifying or characterizing the web browser or operating system running on the user's client system 630. The request may also include location information identifying a geographic location of the user's client system 630 or a logical network location of the user's client system 630. The request may also include a timestamp identifying when the request was transmitted.

Although the example network environment 600 described above and illustrated in FIG. 6 is described with respect to the social networking system 620a and the game networking system 620b, this disclosure encompasses any suitable network environment using any suitable systems. As an example and not by way of limitation, the network environment 600 may include online media systems, online reviewing systems, online search engines, online advertising systems, or any combination of two or more such systems.

Figure 7:
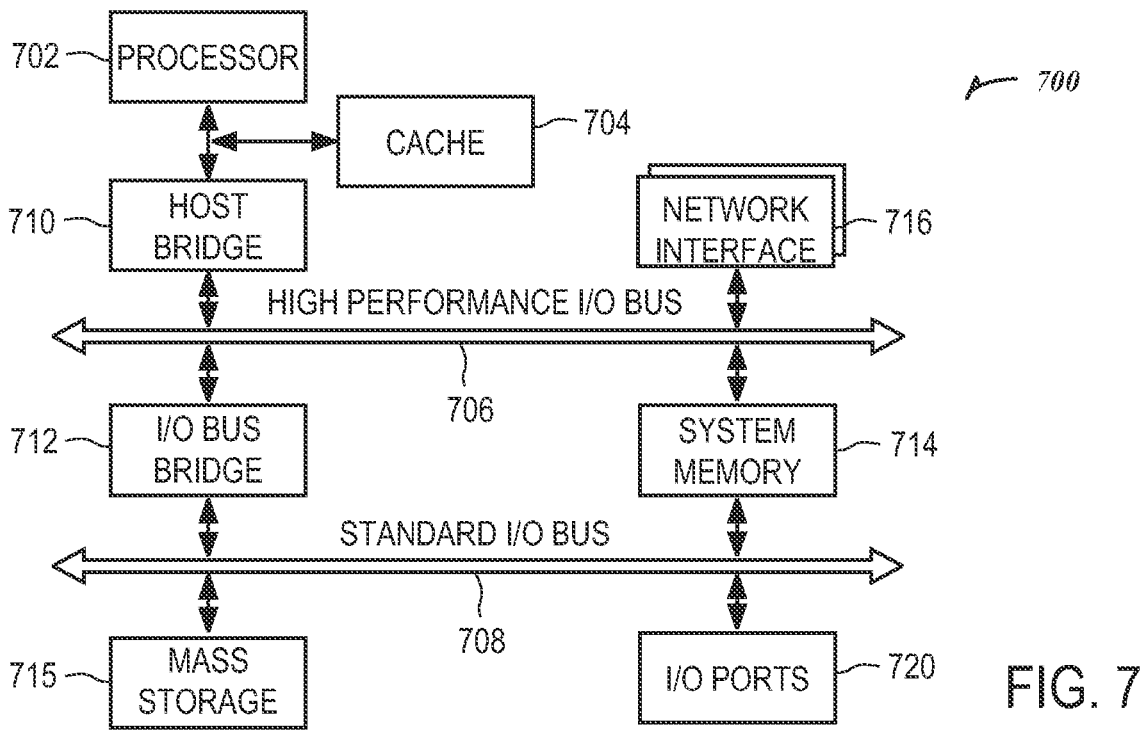
FIG. 7 illustrates an example of a computing system architecture, which may be used to implement a server or a client system, in which an embodiment may operate.

FIG. 7 illustrates an example computing system architecture, which may be used to implement the server 622 or the client system 630. In one embodiment, a hardware system 700 comprises a processor 702, a cache memory 704, and one or more executable modules and drivers, stored on a tangible computer-readable medium, directed to the functions described herein. Additionally, hardware system 700 may include a high performance input/output (I/O) bus 706 and a standard I/O bus 708. A host bridge 710 may couple the processor 702 to a high performance I/O bus 706, whereas an I/O bus bridge 712 couples the two buses 706 and 708 to each other. A system memory 714 and one or more network/communication interfaces 716 may couple to the bus 706. The hardware system 700 may further include video memory (not shown) and a display device coupled to the video memory. A mass storage 715 and I/O ports 720 may couple to the bus 708. The hardware system 700 may optionally include a keyboard, a pointing device, and a display device (not shown) coupled to the bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 700 are described in greater detail below. In particular, the network interface 716 provides communication between the hardware system 700 and any of a wide range of networks, such as an Ethernet (e.g., IEEE 802.3) network, a backplane, etc. The mass storage 718 provides permanent storage for the data and programming instructions to perform the above-described functions implemented in the servers 622 of FIG. 6, whereas the system memory 714 (e.g., DRAM) provides temporary storage for the data and programming instructions when executed by the processor 702. The I/O ports 720 are one or more serial and/or parallel communication ports that provide communication between additional peripheral devices which may be coupled to the hardware system 700.

The hardware system 700 may include a variety of system architectures, and various components of the hardware system 700 may be rearranged. For example, the cache memory 704 may be on-chip with the processor 702. Alternatively, the cache memory 704 and the processor 702 may be packed together as a "processor module," with the processor 702 being referred to as the "processor core," Furthermore, certain embodiments of the present disclosure may not include all of the above components. For example, the peripheral devices shown coupled to the standard I/O bus 708 may couple to the high performance I/O bus 706. In addition, in some embodiments, only a single bus may exist, with the components of the hardware system 700 being coupled to the single bus. Furthermore, the hardware system 700 may include additional components, such as additional processors, storage devices, or memories.

An operating system manages and controls the operation of the hardware system 700, including the input and output of data to and from software applications (not shown). The operating system provides an interface between the software applications being executed on the hardware system 700 and the hardware components of the hardware system 700. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations may be comprised of instructions that are stored on non-transitory storage media. The instructions may be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Programming Interfaces (APIs).)

One or more features from any embodiment may be combined with one or more features of any other embodiment without departing from the scope of the disclosure. For example, the methods, game features and game mechanics described herein may be implemented using hardware components, software components, and/or any combination thereof. By way of example, while embodiments of the present disclosure have been described as operating in connection with a networking website, various embodiments of the present disclosure may be used in connection with any communications facility that supports web applications. Furthermore, in some embodiments the term "web service" and "website" may be used interchangeably, and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense.

What is claimed is:

1. A method comprising:
extracting, using a hardware-implemented decoding module, encoded alpha channel data from a compressed image representation;
identifying at least one common type pixel run represented in the encoded alpha channel data;
identifying at least one lookup type pixel run in the encoded alpha channel data;
applying a common alpha channel value to each of a plurality of pixels in a decompressed image representation correlating to the at least one common type pixel run; and
for each pixel in the decompressed image representation correlating to the at least one lookup type pixel run:
determining an alpha channel value based on pixel data, specific to the pixel, in the encoded alpha channel data; and
applying the alpha channel value to the pixel.

2. The method of claim 1, comprising:
extracting encoded color data from the compressed image representation, the encoded color data being separate from the encoded alpha channel data in the compressed image representation; and
applying the color data to the decompressed image representation.

3. The method of claim 2, wherein the encoded color data is in a PEG format.

4. The method of claim 2, wherein applying the color data to the decompressed image representation includes passing the color data to an application environment facility to decode and populate color information of the decompressed image representation.

5. The method of claim 1, wherein extracting encoded alpha channel data includes decompressing compressed encoded alpha channel data in the compressed image representation.

6. The method of claim 1, wherein the encoded alpha channel data comprises a plurality of pixel runs, including the at least one common type pixel run and the at least one lookup type pixel run, the plurality of pixel runs being of uniform pixel length.

7. The method of claim 1, comprising extracting a pixel length of the at least one common type pixel run from metadata in the encoded alpha channel data.

8. The method of claim 1, wherein determining the alpha channel value includes referencing a palette with the pixel data, the palette being in the encoded alpha channel data.

9. The method of claim 1, further comprising determining a common type pixel run characteristic for the at least one common type pixel run, applying the common alpha channel value to each of the plurality of pixels correlating to the at least one common type pixel run being based at least in part on the common pixel run characteristic.

10. A method comprising:
generating, using a hardware-implemented encoding module, a representation of a common type pixel run in an encoded alpha channel of a compressed image representation from a set of contiguous common alpha channel value pixels in an original image representation, members of the set of common contiguous alpha channel value pixels sharing a common alpha channel value in a set of common alpha channel values, the representation of the common type pixel run including a common type pixel run characteristic correlating to the common alpha channel value;
generating a representation of a lookup type pixel run in encoded alpha channel data from a set of contiguous lookup alpha channel value pixels in the original image representation, at least one member of the set of contiguous lookup alpha channel value pixels having at least one of an original alpha channel value that is different than another member of the set of contiguous lookup alpha channel value pixels or not in the set of common alpha channel values; and
generating, for each pixel in the set of lookup alpha channel value pixels, pixel data in the encoded alpha channel data, the pixel data including an alpha channel value representation of an alpha channel value correlating to the pixel.

11. The method of claim 10, wherein at least one of the common alpha channel value or the alpha channel value is quantized to respectively produce the common type pixel run characteristic or the alpha channel value representation.

12. The method of claim 11, wherein the alpha channel value representation is an index to a palette in the encoded alpha channel data.

13. The method of claim 12, comprising generating the palette by mapping original alpha channel values from the original image representation to palette entries, a number of palette entries being fewer than a number of possible original alpha channel values.

14. The method of claim 13, wherein the number of palette entries is fewer than a number of original alpha channel values, the number of original alpha channel values being a set of unique alpha channel values of the pixels of the original image representation.

15. The method of claim 10, comprising compressing the encoded alpha channel data to create compressed encoded alpha channel data.

16. The method of claim 10, wherein a length of a pixel run represented in the encoded alpha channel data is uniform for every pixel run represented in the encoded alpha channel data, including the common type pixel run and the lookup type pixel run.

17. The method of claim 16, comprising selecting the length of the pixel run from a plurality of lengths based on a greater degree of data reduction between the original image representation and the compressed image representation.

18. The method of claim 16, comprising recording the length of the pixel run in metadata of the encoded alpha channel data.

19. The method of claim 10, wherein the set of common alpha channel values has fever members than a number of possible original alpha channel values from the original image representation.

20. The method of claim 19, wherein the set of common alpha channel values consists of opaque and transparent.

21. The method of claim 10, comprising:
separating color data from the original image representation from alpha channel data in the original image representation; and
generating encoded color data in the compressed image representation by encoding the color data to create encoded color data.

22. The method of claim 21, wherein the encoded color data is in a JPEG format.

23. A non-transitory computer-readable medium including a data structure comprising:
encoded alpha channel data, the encoded alpha channel data including:
a representation of a common type pixel run including a common type pixel run characteristic;

a representation of a lookup type pixel run; and pixel data for each pixel represented by the lookup type pixel run, the pixel data including a representation of an alpha channel value.

24. The computer-readable medium of claim 23, wherein a structure comprises encoded color data.

25. The computer-readable medium of claim 23, wherein the encoded alpha channel data includes a palette; and wherein at least one of the common type pixel run characteristic or the representation of the alpha channel value include an index to an entry of the palette.

26. The computer-readable medium of claim 23, wherein a length of a pixel run represented in the encoded alpha channel data is uniform for every pixel run represented in the encoded alpha channel data including the common type pixel run and the lookup type pixel run.

27. The computer-readable medium of claim 26, wherein the encoded alpha channel data includes metadata including a length of the pixel run.

28. A system comprising:

a hardware-implemented decoding module configured to:

extract encoded alpha channel data from a compressed image representation;

determine, for at least one common type pixel run represented in the encoded alpha channel data, a common type pixel run characteristic;

apply, based on the common type pixel run characteristic, a common alpha channel value to pixels in a decompressed image representation correlated to the at least one common type pixel run; and process pixels in the decompressed image representation correlated to at least one lookup type pixel run represented in the encoded alpha channel data, the process configured to, for each pixel in the decompressed image representation correlated to the at least one lookup type pixel run:

determine an alpha channel value based on pixel data, specific to the pixel, in the encoded alpha channel data; and apply the alpha channel value to the pixel.

29. The system of claim 28, wherein the decoding module is configured to:

extract encoded color data from the compressed image representation, the encoded color data being separate from the encoded alpha channel data in the compressed image representation; and apply the color data to the decompressed image representation.

30. The system of claim 29, wherein the encoded color data is in a PEG format.

31. The system of claim 29, wherein to apply the color data to the decompressed image representation includes to pass the color data to an application environment facility to decode and populate color information of the decompressed image representation.

32. The system of claim 28, comprising a decompression module configured to decompress compressed encoded alpha channel data in the compressed image representation.

33. The system of claim 28, wherein a length of a pixel run represented in the encoded alpha channel data is uniform for every pixel run represented in the encoded alpha channel data including the common type pixel run and the lookup type pixel run.

34. The system of claim 28, wherein the decoding module is configured to extract a length of a pixel run from metadata in the encoded alpha channel data.

35. The system of claim 28, wherein to determine the alpha channel value includes to reference a palette with the pixel data, the palette being in the encoded alpha channel data.

36. A system comprising:

a hardware-implemented encoding module configured to:

generate a representation of a common type pixel run in an encoded alpha channel of a compressed image representation from a set of contiguous common alpha channel value pixels in an original image representation, members of the set of common contiguous alpha channel value pixels sharing a common alpha channel value in a set of common alpha channel values, the representation of the common type pixel run including a common type pixel run characteristic correlating to the common alpha channel value;

generate a representation of a lookup type pixel run in encoded alpha channel data from a set of contiguous lookup alpha channel value pixels in the original image representation, at least one member of the set of contiguous lookup alpha channel value pixels having at least one of an original alpha channel value that is different than another member of the set of contiguous lookup alpha channel value pixels or not in the set of common alpha channel values; and generate, for each pixel in the set of lookup alpha channel value pixels, pixel data in the encoded alpha channel data, the pixel data including an alpha channel value representation of an alpha channel value correlating to the pixel.

37. The system of claim 36, wherein the encoding module is configured to quantize at least one of the common alpha channel value or the alpha channel value to respectively produce the common type pixel run characteristic or the alpha channel value representation.

38. The system of claim 37, wherein the alpha channel value representation is an index to a palette in the encoded alpha channel data.

39. The system of claim 38, wherein the encoding module is configured to generate the palate including to map original alpha channel values from the original image representation to palette entries, a number of palette entries being fewer than a number of possible original alpha channel values.

40. The system of claim 39, wherein the number of palette entries is fewer than a number of original alpha channel values, a number of original alpha channel values being a set of unique alpha channel values of the pixels of the original image representation.

41. The system of claim 36, comprising a compression module configured to compress encoded alpha channel data to create compressed encoded alpha channel data.

42. The system of claim 36, wherein a length of a pixel run represented in the encoded alpha channel data is uniform for every pixel run represented in the encoded alpha channel data including the common type pixel run and the lookup type pixel run.

43. The system of claim 42, wherein the encoding module is configured to select the length of the pixel run from a plurality of lengths based on a greater degree of data reduction between the original image representation and the compressed image representation.

44. The system of claim 42, wherein the encoding module is configured to record the length of the pixel run in metadata of the encoded alpha channel data.

45. The system of claim 36, wherein the set of common alpha channel values has fewer members than a number of possible original alpha channel values from the original image representation.

46. The system of claim 45, wherein the set of common alpha channel values consists of opaque and transparent.

47. The system of claim 36, wherein the encoding module is configured to:
- separate color data from the original image representation from alpha channel data in the original image representation; and
- generate encoded color data in the compressed image representation including to encode the color data to create encoded color data.

48. The system of claim 47, wherein the encoded color data is in a JPEG format.

\* \* \* \* \*

UNITED STATES PATENT AND TRADEMARK OFFICE
CERTIFICATE OF CORRECTION

PATENT NO. : 8,655,086 B1
APPLICATION NO. : 13/435651
DATED : February 18, 2014
INVENTOR(S) : Christensen et al.

It is certified that error appears in the above-identified patent and that said Letters Patent is hereby corrected as shown below:

On the Title Page, Item (73), in "Assignee", in column 1, line 1, delete "Zynga, Inc.," and insert --Zynga Inc.,--, therefor In the Specification In column 4, line 11, delete "variance" and insert --(e.g., variance--, therefor In column 4, line 13, delete "nm" and insert --run--, therefor In column 4, line 21, after "value", insert --pixels,--, therefor In column 4, line 46, delete "via" and insert --(e.g., via--, therefor In column 5, line 4, delete "PEG" and insert --JPEG--, therefor In column 6, line 19, delete "PEG" and insert --JPEG--, therefor In column 8, line 11, after "value", insert --pixels,--, therefor In column 8, line 33, delete "using" and insert --(e.g., using--, therefor In column 10, line 53, after "implemented", insert --by--, therefor In column 10, line 58, delete "MySQL" and insert --(e.g., MySQL--, therefor In column 10, line 65, delete "in or" and insert --in-or--, therefor In column 12, line 12, delete "Amass" and insert --A mass--, therefor Signed and Sealed this
Third Day of February, 2015

Michelle K. Lee
*Deputy Director of the United States Patent and Trademark Office*

In column 12, line 44, delete "core,"" and insert --core."--, therefor

In column 14, line 17, delete "a" and insert --(e.g., a--, therefor

In the Claims

In column 15, line 29, in Claim 3, delete "PEG" and insert --JPEG--, therefor

In column 16, line 28, in Claim 14, delete "is" and insert --are--, therefor

In column 16, line 48, in Claim 19, delete "fever" and insert --fewer--, therefor In column 17, line 5, in Claim 24, delete "a" and insert --the data--, therefor In column 17, line 51, in Claim 30, delete "PEG" and insert --JPEG--, therefor In column 18, line 39, in Claim 39, delete "palate" and insert --palette--, therefor